United States Patent
Senda et al.

(10) Patent No.: US 10,067,492 B2
(45) Date of Patent: Sep. 4, 2018

(54) PROGRAMMABLE LOGIC CONTROLLER AND PROGRAMMING TOOL FOR PROGRAMMABLE LOGIC CONTROLLER

(71) Applicant: JTEKT CORPORATION, Osaka-shi (JP)

(72) Inventors: Terukazu Senda, Obu (JP); Kenji Yoshida, Anjo (JP); Satoshi Kato, Chiryu (JP)

(73) Assignee: JTEKT CORPORATION, Osaka-shi (JP)

( * ) Notice: Subject to any disclaimer, the term of this patent is extended or adjusted under 35 U.S.C. 154(b) by 377 days.

(21) Appl. No.: 14/664,038

(22) Filed: Mar. 20, 2015

(65) Prior Publication Data

US 2015/0277415 A1    Oct. 1, 2015

(30) Foreign Application Priority Data

Mar. 31, 2014 (JP) .................................. 2014-072251

(51) Int. Cl.
*G05B 19/05* (2006.01)
*G05B 19/042* (2006.01)

(52) U.S. Cl.
CPC ......... *G05B 19/052* (2013.01); *G05B 19/042* (2013.01); *G05B 19/056* (2013.01);
(Continued)

(58) Field of Classification Search
CPC ................ G05B 19/052; G05B 19/056; G05B 2219/1204; G05B 2219/13153
See application file for complete search history.

(56) References Cited

U.S. PATENT DOCUMENTS 6,381,501 B1 * 4/2002 Takase ................. G05B 19/052
  700/2
6,422,463 B1 * 7/2002 Flink .................. G07C 9/00031
  235/380

(Continued)

FOREIGN PATENT DOCUMENTS

EP    1 231 526 A1   8/2002
EP    2 098 927 A1   9/2009
(Continued)

OTHER PUBLICATIONS

W. Hu, A. G. Starr, A. Y. T. Leung, "Operational Fault Diagnosis of Manufacturing Systems", Journal of Materials Processing Technology, vol. 133, 2003, pp. 108-117.*

(Continued)

*Primary Examiner* — Crystal J Barnes-Bullock
(74) *Attorney, Agent, or Firm* — Oblon, McClelland, Maier & Neustadt, L.L.P.

(57) ABSTRACT

A programmable logic controller capable of improving the expandability of a distributed control system and a programming tool for the programmable logic controller are provided. A programmable logic controller (PLC) that constitutes a distributed control system includes: a variable table that includes variable information including identification symbols for identification of a plurality of PLCs and variable names of reference variables, the variable information being set for each of the reference variables; a storage device that has a memory region for storing the reference variables; and an interface circuit that mutually converts communication data for use in communication between the PLC and a different PLC and the reference variables stored in the memory region. The reference variables are variables mutually referenced by the plurality of PLCs.

10 Claims, 6 Drawing Sheets

(52) U.S. Cl.
CPC ........... *G05B 2219/1204* (2013.01); *G05B 2219/13153* (2013.01)

(56) References Cited

U.S. PATENT DOCUMENTS

| | | | |
|---|---|---|---|
| 6,594,529 B1* | 7/2003 | Boggs | G05B 19/0423 365/189.05 |
| 7,024,463 B1 | 4/2006 | Hitomi et al. | |
| 7,151,966 B1* | 12/2006 | Baier | G05B 19/056 700/19 |
| 7,225,037 B2* | 5/2007 | Shani | G05B 19/056 700/18 |
| 7,505,875 B2* | 3/2009 | Jinzenji | G05B 19/052 340/521 |
| 7,568,198 B2* | 7/2009 | Chandhoke | G05B 19/056 700/23 |
| 8,321,037 B2* | 11/2012 | Araki | G05B 19/058 700/18 |
| 8,898,633 B2* | 11/2014 | Bryant | G05B 19/056 717/106 |
| 2005/0097233 A1* | 5/2005 | Oka | G05B 19/054 710/9 |
| 2005/0102556 A1 | 5/2005 | Yamada et al. | |
| 2006/0253838 A1* | 11/2006 | Fujii | G06F 9/44505 717/124 |
| 2008/0052435 A1* | 2/2008 | Norwood | H05K 7/1467 710/301 |
| 2009/0106761 A1* | 4/2009 | Chandhoke | G06F 9/4881 718/103 |
| 2010/0057220 A1 | 3/2010 | Araki | |
| 2014/0046457 A1* | 2/2014 | Taber | G05B 19/056 700/2 |

FOREIGN PATENT DOCUMENTS

| | | |
|---|---|---|
| JP | 2002-276608 | 9/2002 |
| JP | 2005-129026 | 5/2005 |
| JP | 2008-262453 | 10/2008 |
| JP | 2011-165058 | 8/2011 |
| WO | WO 01/27701 A1 | 4/2001 |

OTHER PUBLICATIONS

Extended European Search Report dated Oct. 26, 2015 in Patent Application No. 15161264.5.

Office Action dated Oct. 31, 2017 in Japanese Patent Application No. 2014-072251 (with unedited computer generated English translation).

Translation of Office Action dated Mar. 13, 2018 in Japanese Patent Application No. 2014-072251, citing documents AO AP and AQ therein, 3 pages.

* cited by examiner

FIG. 4

[VARIABLE TABLE Tb, TAG TABLE]

| IDENTIFICATION SYMBOL | PART NAME | VARIABLE NAME | VARIABLE TYPE | DESIGNATED ADDRESS | EXECUTION ADDRESS | MEMORY REGION |
|---|---|---|---|---|---|---|
| <01> | 1M1 | D3X | BIT | (AUTO) | M000 | B1[0] |
| <01> | 1M1 | D8X | BIT | (AUTO) | M001 | B1[1] |
| ---- | ---- | ---- | ---- | ---- | ---- | ---- |
| <01> | 11K1 | D6X | BIT | EVE38 | — | B1[s] |
| <02> | 2M1 | D4X | BIT | (AUTO) | M005 | B2[0] |
| <02> | 2M1 | D10X | BIT | (AUTO) | M006 | B2[1] |
| ---- | ---- | ---- | ---- | ---- | ---- | ---- |
| <02> | 2DM | D9X | BIT | (AUTO) | M015 | B2[11] |
| ---- | ---- | ---- | ---- | ---- | ---- | ---- |
| <02> | 2M1 | D14X | BIT | (AUTO) | M030 | B2[t] |
| <03> | 21 | D22X | BIT | (AUTO) | M001 | B3[0] |
| <03> | 3M | D28X | BIT | (AUTO) | M002 | B3[2] |
| <03> | 3M | D30X | BIT | (AUTO) | M003 | B3[3] |
| <03> | 3M | D35X | BIT | (AUTO) | M004 | B3[4] |
| ---- | ---- | ---- | ---- | ---- | ---- | ---- |
| <03> | 3M2 | D12X | BIT | (AUTO) | M025 | B3[u] |

F I G. 5

| [LINK MEMORY REGION Mn OF PLC-1] |
|---|
| FOR TRANSMISSION  B1[0]~B1[s] |
| FOR RECEPTION  B2[0]~B2[t] |
| FOR RECEPTION  B3[0]~B3[u] |

| [LINK MEMORY REGION Mn OF PLC-2] |
|---|
| FOR RECEPTION  B1[0]~B1[s] |
| FOR TRANSMISSION  B2[0]~B2[t] |
| FOR RECEPTION  B3[0]~B3[u] |

| [LINK MEMORY REGION Mn OF PLC-3] |
|---|
| FOR RECEPTION  B1[0]~B1[s] |
| FOR RECEPTION  B2[0]~B2[t] |
| FOR TRANSMISSION  B3[0]~B3[u] |

… (1) …

PROGRAMMABLE LOGIC CONTROLLER AND PROGRAMMING TOOL FOR PROGRAMMABLE LOGIC CONTROLLER

INCORPORATION BY REFERENCE

The disclosure of Japanese Patent Application No. 2014-072251 filed on Mar. 31, 2014 including the specification, drawings and abstract, is incorporated herein by reference in its entirety.

BACKGROUND OF THE INVENTION

1. Field of the Invention

The present invention relates to a programmable logic controller (hereinafter abbreviated as "PLC"), and to a programming tool for editing a sequence program for the PLC.

2. Description of the Related Art

A distributed control system composed of a plurality of PLCs that coordinate with (cooperate) each other to perform sequence control is occasionally used in a control device for production facilities or the like (see Japanese Patent Application Publication No. 2008-262453 (JP 2008-262453 A)). A program corresponding to a sequence circuit generated in units of modules and an interface circuit for communication among the PLCs, for example, is written into each of the PLCs. In the case where a data link scheme is adopted, the PLCs execute sequence control with data for communication via a network held in an allocated prescribed memory region.

In the distributed control system described above, the number of PLCs is occasionally increased and decreased as the distributed control system is functionally expanded, partially functionally disabled, or the like to change the configuration of the distributed control system. In such a case, it is necessary to correct the program corresponding to the sequence circuit or the interface circuit or the like or reallocate the memory region such that sequence control and communication among the PLCs are performed normally in the changed distributed control system. Therefore, a change in configuration of the distributed control system along with increase and decrease in number of PLCs has required additional work such as preparation and correction of a sequence program and writing the program into the PLCs.

SUMMARY OF THE INVENTION

It is an object of the present invention to provide a PLC capable of improving the expandability of a distributed control system, and a programming tool for the PLC.

An aspect of the present invention provides a programmable logic controller including:

a variable table;

a storage device; and an interface circuit, in which:

the programmable logic controller performs sequence control in coordination with a different programmable logic controller to constitute a distributed control system;

the programmable logic controller includes reference variables which are variables to be referenced by the different programmable logic controller in the sequence control;

the variable table includes variable information including identification symbols that indicate individual programmable logic controllers that constitute the distributed control system and variable names of the reference variables, the variable information being set for each of the reference variables;

the storage device has a memory region for storing values of the reference variables; and the interface circuit mutually partially duplicates communication data for use in communication between the programmable logic controller and the different programmable logic controller and the values of the reference variables stored in the memory region.

According to such a configuration, the PLC executes sequence control, with the memory region, in which at least the reference variables as the subjects to be communicated by the PLC with the different PLC are stored, secured in the storage device. In the distributed control system composed of such PLCs, a state in which sequence control can be executed normally is maintained without correcting the sequence circuit or the interface circuit or reallocating the memory region if a change in configuration falls within the range assumed from the variable table. Thus, the expandability of the distributed control system is improved.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 4 illustrates a variable table in FIG. 2;

FIG. 5 illustrates link memory regions secured in storage devices of the PLCs;

DETAILED DESCRIPTION OF EMBODIMENTS

A programmable logic controller (hereinafter abbreviated as "PLC") and a programming tool for the PLC according to an embodiment of the present invention will be described below with reference to the drawings. The PLC according to the embodiment is applied to a distributed control system in which a plurality of PLCs coordinate with each other to perform sequence control. The programming tool is software for editing a sequence program and a link program for the PLC.

Figure 1:
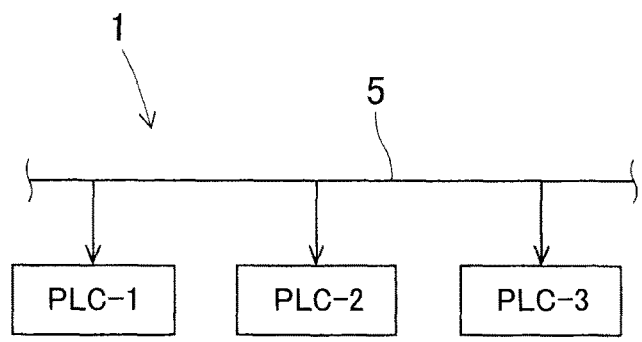
FIG. 1 is a block diagram illustrating a distributed control system according to a first embodiment.

The configuration of a distributed control system 1 and a plurality of PLCs according to a first embodiment of the present invention will be described with reference to FIGS. 1 to 6. The distributed control system 1 is a control system in which control functions are distributed in advance, and the formation of the system can be changed as necessary. As illustrated in FIG. 1, the distributed control system 1 is composed of PLC-1 to PLC-3 connected so as to be communicable via a network 5, a processing device (not illustrated), and so forth.

The network 5 conforms to a predetermined network standard. The network 5 according to the embodiment adopts the FL-net standard. The network 5 is an FL-net network in which the PLC-1 to the PLC-3 serve as nodes (individual devices as the subjects of communication). In the network 5, the nodes exchange a right to transmit data (a token) in a determined order. That is, a node having a token broadcasts communication packets, and thereafter sends the token to the next node within a prescribed time after the token is received. The PLC-1 to the PLC-3 constituting the distributed control system 1 can share necessary data through the network 5.

Figure 2:
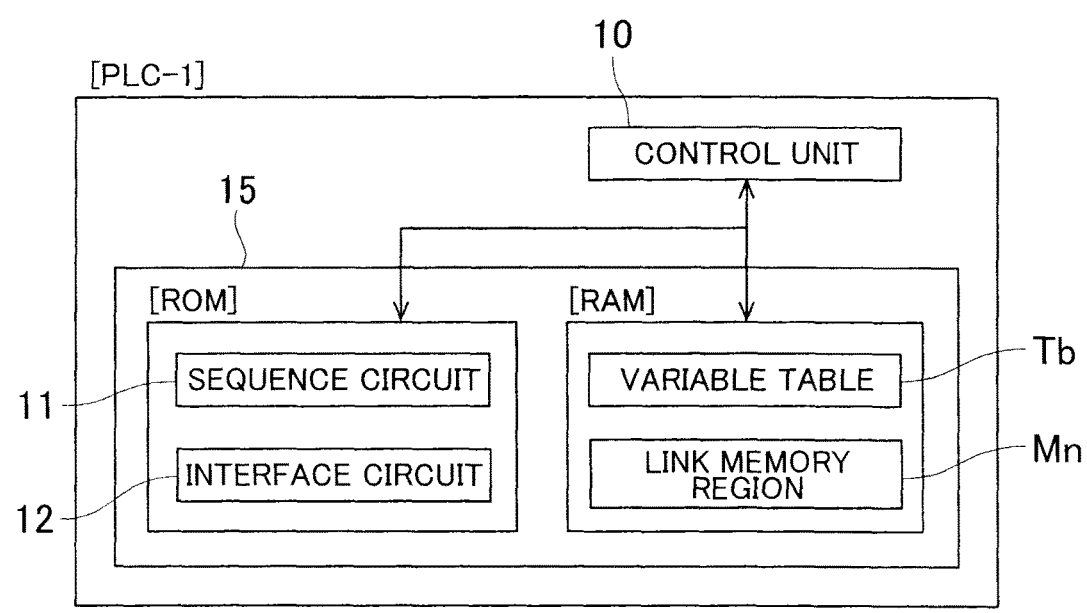
FIG. 2 is a block diagram illustrating the configuration of a PLC.

As illustrated in FIG. 2, the PLC-1 includes a control unit 10 and a storage device 15. The control unit 10 is composed of a microprocessor (not illustrated) etc., and executes various programs written into a ROM of the storage device 15. The storage device 15 is composed of a ROM, a RAM, and so forth. The various programs are read from and written into the storage device 15. The configuration of the PLC-2 and the PLC-3 is substantially the same as that of the PLC-1, and is not described in detail.

An execution program corresponding to a sequence circuit 11 and an interface circuit 12 is written into the ROM of the storage device 15. Hereinafter, the execution program described above will be referred to as "sequence circuit" or "interface circuit" for convenience. The sequence circuit 11 and the interface circuit 12 are generated by a programming tool for the PLC by compiling a source program expressed in the form of a ladder diagram. Hereinafter, the source program will be referred to as "sequence program" and "link program". The sequence circuits 11 of the PLC-1 to the PLC-3 correspond to sequence programs Ps1 to Ps3 illustrated as the ladder diagram in FIG. 3. The interface circuits 12 of the PLC-1 to the PLC-3 correspond to link programs Pn1 to Pn3 illustrated as the ladder diagram in FIG. 3.

In the distributed control system 1, the PLC-1 to the PLC-3 coordinate with each other to perform sequence control, and thus it is necessary for a PLC to reference a variable held in a different PLC. A variable to be referenced by a PLC in sequence control, among variables held in (stored in, changed by) a different PLC, is defined as a reference variable. For example, a local variable of the PLC-2 to be referenced inside the sequence circuit 11 by the PLC-1, among local variables held in the PLC-2, corresponds to the reference variable described above. This also applies to the relationship among the different PLC-1 to PLC-3.

Figure 3:
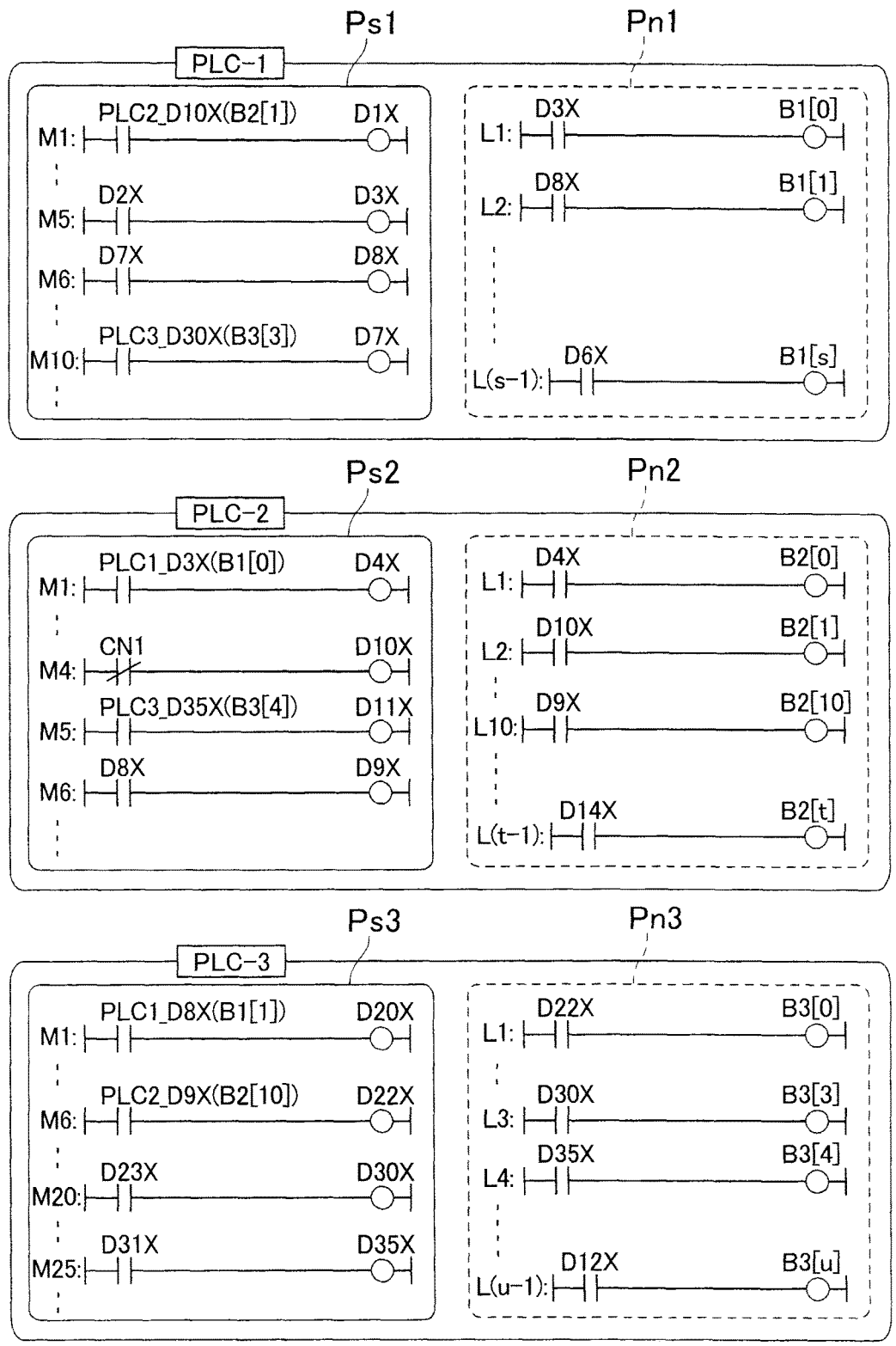
FIG. 3 is a ladder diagram illustrating sequence circuits and interface circuits in PLCs.

Specifically, in FIG. 3, in a first step (M1) of the sequence program Ps1 of the PLC-1, a local variable (D10X) of the PLC-2, which reflects the result of computation in a fourth step (M4) of the sequence program Ps2 of the PLC-2, is referenced. In the sequence program Ps1, the variable name indicating the local variable (D10X) is denoted as "PLC-2_D10X". In this case, the local variable D10X of the PLC-2 is a reference variable to be referenced by the PLC-1 in sequence control. The reference variable is the subject to be communicated between the PLC-1 and the PLC-2.

A variable table Tb, temporary data generated during execution of the various programs, and so forth are stored in the RAM of the storage device 15 illustrated in FIG. 2. The variable table Tb includes an identification symbol for identification of a PLC that holds a reference variable, and variable information including a variable name of the reference variable. The identification symbol and the variable information are set for each reference variable. For example, in the variable table Tb illustrated in FIG. 4, the reference variable (D10X) described above is set in association with variable information Iv22 (not illustrated) including an identification symbol "<02>", which represents the PLC-2 which holds the reference variable, and a variable name "D10X".

In the variable table Tb, the variable information is individually set for all the reference variables that belong to each PLC. All the reference variables described above are reference variables that may be the subjects to be communicated among the plurality of PLCs constituting the distributed control system 1 in a facility environment in which the distributed control system 1 is subjected to all the assumable functional expansions. That is, all the reference variables include reference variables that are not actually connected to the network 5 but that are assumed as the subjects to be communicated in communication with expanded PLCs expected to be additionally installed.

A link memory region Mn is secured in the RAM of the storage device 15. At least reference variables as the subjects to be communicated by the PLC, among all the reference variables, are stored in the link memory region Mn. That is, at least reference variables to be transmitted and received by the PLC-1 are stored in the memory region Mn of the storage device 15 of the PLC-1. In the embodiment, the link memory region Mn for storing all the reference variables set in the variable table Tb is allocated to the storage device 15.

As illustrated in FIG. 5, communication variables B1 to B3 corresponding to the PLC-1 to the PLC-3, respectively, are stored in the link memory region Mn. Particularly, the PLC-1 stores, as data to be transmitted by the PLC-1 itself, variables to be referenced by the different PLCs in the link memory region Mn in the name of communication variables B1[0] to B1[s]. The reference variables to be transmitted by the PLC-1 are those given the identification symbol "<01>" in the variable table Tb of FIG. 4.

The PLC-1 stores, as data for reception, variables as the subjects to be communicated among all the PLCs in the link memory region Mn in the name of communication variables B2[0] to B2[t] and B3[0] to B3[u] irrespective of whether or not the PLC-1 itself references such variables in sequence control. The reference variables to be referenced by the PLC-1 in sequence control include variables (D10X) of the different PLC-2 to be referenced in the sequence circuit 11. That is, each of the PLC-1 to the PLC-3 holds all the reference variables as the subjects to be communicated, and the link memory regions for transmission and reception by the PLC-1 to the PLC-3 have different addresses.

In the case where data are exchanged among the PLCs, the local variable and the address of the PLC as the communication partner cannot be directly referenced, and therefore communication via the interface circuit 12 is necessary. The interface circuit 12 mutually partially copies communication data for use in communication among the PLC-1 to the PLC-3 and reference variables stored in the link memory region Mn. More particularly, the reference variables are converted into communication variables by the interface circuit 12, and the communication variables are linked with reference variables of different PLCs referenced by the sequence circuit 11 of each PLC.

Figure 6:
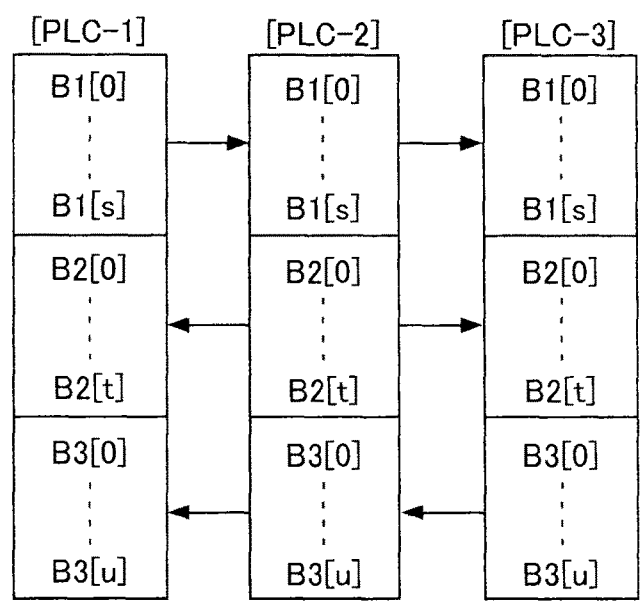
FIG. 6 illustrates data for communication among the PLCs and the flow of the data.

The communication data described above are in a format that conforms to the network standard of the network 5. In the embodiment in which the FL-net is adopted, the communication data are communication packets having a structure in which the communication variables B1 to B3 of the PLC-1 to the PLC-3 are coupled to each other as illustrated in FIG. 6. For example, in the case where the result of computation is input to (reflected in) a reference variable during execution of sequence control, the interface circuit 12 of the PLC-1 stores the result of computation in the communication variable B1[*] corresponding to the reference variable (a value of 0 to s is entered into [*]).

Then, when the PLC-1 receives a token (transmission right), the interface circuit 12 of the PLC-1 writes values stored in the communication variables B1[0] to B1[s] in the link memory region Mn into a region of the communication data to be transmitted by the PLC itself (PLC-1). The communication data are transmitted over the network 5 by the PLC-1. In the case where the PLC-1 receives communication data transmitted by a different PLC, the interface circuit 12 writes data in a reception region of the communication data into the communication variables B2[0] to B2[t] and B3[0] to B3[u] in the link memory region Mn. Consequently, when a value is input to a reference variable (D10X, B2[1]) held by the PLC-2 to turn on the variable D10X in sequence programs Ps1, for example, the first step (M1) of the sequence program Ps1 illustrated in FIG. 3 is executed.

According to the configuration discussed above, the PLC-1 to the PLC-3 execute sequence control, while each securing in the storage device 15 the link memory region Mn, in which at least reference variables as the subjects to be communicated by the PLC with a different PLC are stored. In the distributed control system 1 composed of such PLC-1 to PLC-3, if a change in configuration falls within the range assumed from the variable table Tb, that is, the number of PLCs falls within the maximum number of PLCs set on the variable table Tb and the number of reference variables of different PLCs used by the sequence program of each PLC falls within the maximum number of reference variables of each PLC set on the variable table Tb, a state in which sequence control can be executed normally is maintained without correcting the sequence circuit 11 or the interface circuit 12 or reallocating the link memory region Mn. Thus, the expandability of the distributed control system 1 is improved. A change in configuration of the distributed control system 1 will be described below.

Additional installation of an expansion PLC in the distributed control system 1 will be described. The PLC-3 is an expansion PLC expected to be additionally installed in the distributed control system 1 composed of the PLC-1 and the PLC-2. The PLC-3 corresponds to the different PLC according to the present invention. In the facility environment before additional installation, the PLC-1 and the PLC-2 excluding the PLC-3 are connected to the network 5.

Before additional installation of the PLC-3, the distributed control system 1 can execute sequence control that matches the facility environment before additional installation if communication is performed only for variables to be mutually referenced by the PLC-1 and the PLC-2. With a facility environment that assumes additional installation of the PLC-3, the distributed control system 1 permits additional installation of the PLC-3 without correcting the sequence circuit 11 or the interface circuit 12 or reallocating the link memory region Mn.

Specifically, the distributed control system 1 is configured as follows. The reference variables in the distributed control system 1 include variables referenced by the existing PLCs (the PLC-1 and the PLC-2), among variables held by the expansion PLC (PLC-3). Hence, as illustrated in FIG. 4, the variable table Tb which is common to the PLC-1 and the PLC-2 includes variable information Iv3 (information having an identification symbol <03>) on reference variables that belong to the PLC-3.

As illustrated in FIG. 5, the link memory region Mn which stores all the reference variables set in the variable table Tb (including the reference variables which belong to the PLC-3) is allocated to the RAM of the storage device 15 in the PLC-1 and the PLC-2. As illustrated in FIG. 6, a transmission region into which data are written by the interface circuit 12 of the PLC-3 is secured in the communication data for use in communication between the PLC-1 and the PLC-2.

The sequence circuit 11 of the PLC-1 and the PLC-2 already includes a step referencing a variable of the PLC-3 (a step M10 of the sequence program Ps1 and a step M5 of the sequence program Ps2 in FIG. 3). In the case where communication data are received, the interface circuit 12 of the PLC-1 and the PLC-2 writes data in the region for transmission by the PLC-3 into the communication variables B3[0] to B3[u]. Before additional installation of the PLC-3, no data are written into the region for transmission by the PLC-3, and therefore initial values are stored in the communication variables B3[0] to B3[u].

As described above, the sequence circuit 11 of the PLC-1 and the PLC-2 includes a step of referencing a variable of the PLC-3. Because the corresponding communication variables B3[0] to B3[u] are not varied from the initial values, however, the step is not executed, and an error handling process is not performed. In this way, the distributed control system 1 composed of the PLC-1 and the PLC-2 can execute sequence control that matches the current facility environment.

It is assumed that the PLC-3 as an expansion PLC is connected to the network 5 so that the PLC-3 is additionally installed in the distributed control system 1. When the distributed control system 1 is turned on in such a state, the PLC-3 is recognized in the FL-net network, and a token is moved in a prescribed order among the PLC-1 to the PLC-3. Then, as the existing PLC-1 and PLC-2, the PLC-3 starts receiving and transmitting communication data. Thus, the distributed control system 1 provides an environment in which sequence control for which the PLC-1 to the PLC-3 coordinate with each other can be executed.

For adding an expansion PLC, the existing PLC-1 and PLC-2 secure in advance the link memory region Mn for storing a reference variable held by the expansion PLC on each storage device 15 on the basis of the variable table Tb to constitute the distributed control system 1 which permits additional installation of the expansion PLC. Consequently, in the case where the facility environment of the distributed control system 1 is to be changed, an expansion PLC can be additionally installed in the distributed control system 1 without correcting the interface circuit 12 or the like of the PLC-1 and the PLC-2 or reallocating the link memory region Mn.

Next, removal of a PLC or a plurality of PLCs constituting the distributed control system 1 will be described. The PLC-3 is a PLC to be removed from the distributed control system 1 composed of the PLC-1 to the PLC-3. The PLC-3 corresponds to the different PLC according to the present invention. In the current facility environment before removal of the PLC-3, the PLC-1 to the PLC-3 are connected to the network 5.

In the distributed control system 1, when a PLC or a plurality of PLCs are removed, reference variables that belong to the removed PLC are not updated any more. Therefore, in the related art, when removal of a PLC is detected, the system is stopped by an error handling process in consideration of the influence on sequence control by the remaining PLCs. In the distributed control system 1 according to the embodiment, in contrast, a facility environment that assumes removal of the PLC-3 is prepared to permit removal of the PLC-3 without correcting the sequence circuit 11 or the interface circuit 12 or reallocating the link memory region Mn.

Specifically, the distributed control system 1 is configured as follows. In the distributed control system 1 in which the PLC-3 has been removed from the network 5, the PLC-1 and the PLC-2 include the common variable table Tb as illustrated in FIG. 4. The PLC-1 and the PLC-2 recognize all the reference variables that are the subjects to be communicated by all the PLCs including the removed PLC-3 on the basis of the variable table Tb.

Then, as illustrated in FIG. 5, the link memory region Mn which stores all the reference variables set in the variable table Tb (including the reference variables which belong to the PLC-3) is allocated to the RAMs of the storage devices 15 in the PLC-1 and the PLC-2. In the link memory region Mn, initial values are substituted into the communication variables B3[0] to B3[u] corresponding to the PLC-3, and maintained. When the PLC-3 is removed, the PLC-3 is not recognized in the FL-net network any more. As illustrated in FIG. 6, however, a transmission region into which data has been written by the interface circuit 12 of the PLC-3 is continuously secured in the communication data for use in communication between the PLC-1 and the PLC-2.

The sequence circuits 11 of the PLC-1 and the PLC-2 still include a step referencing a variable of the PLC-3. However, the corresponding communication variables B3[0] to B3[u] are not varied from the initial values. In this case, the PLC-1 and the PLC-2 do not execute such a step, and do not perform an error handling process.

In this way, the remaining PLC-1 and PLC-2 secure the link memory region Mn for storing a reference variable as the subject to be communicated with the removed PLC-3 in each storage device 15 on the basis of the variable table Tb to constitute the distributed control system 1 which permits removal of the PLC-3. Consequently, it is possible to remove the PLC-3 from the distributed control system 1 without correcting the interface circuit 12 or the like of the PLC-1 and the PLC-2 or reallocating the link memory region Mn in changing the facility environment of the distributed control system 1. In addition, reconnection of the removed PLC-3 is permitted by maintaining such an environment of the distributed control system 1.

Figure 7:
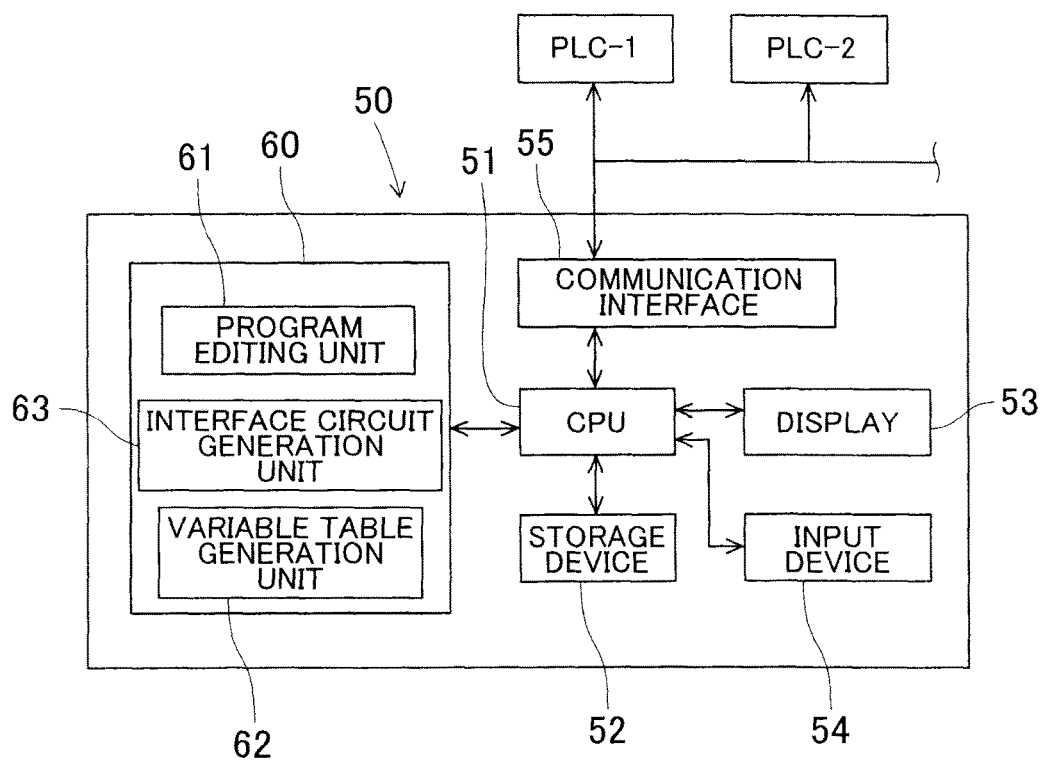
FIG. 7 is a block diagram illustrating an editing device for a sequence program according to a second embodiment.

Next, the overall configuration of an editing device 50 for a sequence program according to a second embodiment of the present invention will be described with reference to FIGS. 3, 4, and 7. The hardware of the editing device 50 is a general-purpose personal computer. As illustrated in FIG. 7, the editing device 50 includes a central processing unit (CPU) 51 that executes a variety of computation processes, a storage device 52, a display 53, an input device 54, and a communication interface 55. The editing device 50 has a function of editing a sequence program through a configuration in which a variety of software including a programming tool 60 for a PLC are installed in the personal computer.

The storage device 52 is composed of a ROM, a RAM, a hard disk drive, and so forth (not illustrated). The variety of programs are read from and written into the storage device 52. The display 53 is a display device, which is an output device used to output a ladder diagram for the sequence program on a screen or the like. The input device 54 is a keyboard or a mouse, for example, and is used to input information during work for editing a ladder diagram for the sequence program or the like. The communication interface 55 is a device that inputs and outputs various data when communication is performed with a PLC via a communication cable (not illustrated).

The programming tool 60 edits a sequence program corresponding to an execution program written into a plurality of PLCs. The programming tool 60 includes a program editing unit 61, a variable table generation unit 62, and an interface circuit generation unit 63. In the embodiment, the program editing unit 61 has a function of editing a ladder diagram which is a program language for a sequence program. The program editing unit 61 causes the display 53 to display a ladder diagram so as to be editable, and receives editing input through the input device 54. The existing sequence program is read from the storage device 52. The edited sequence program is written into the storage device 52 to be stored.

The variable table generation unit 62 receives setting of variable information input through the input device 54 to generate a variable table. Specifically, an operator inputs variable information to a tag table. The variable table generation unit 62 compiles the tag table to generate the variable table Tb illustrated in FIG. 4. In the tag table, an identification symbol, a part name, a variable name (tag), a variable type, and a variable address are set as the variable information for each reference variable. The tag table defines each reference variable, and permits programming that assumes reference among the PLCs.

The interface circuit generation unit 63 generates an interface circuit corresponding to each PLC on the basis of the set variable information and the sequence program. In the case where the interface circuit 12 of the PLC-1 is to be generated, for example, the interface circuit generation unit 63 first specifies reference variables that belong to the PLC-1 on the basis of the set variable information (see FIG. 4) and the sequence programs Ps2 and Ps3 illustrated in FIG. 3.

Next, the interface circuit generation unit 63 allocates the communication variables B1[0] to B1[s] to the plurality of specified reference variables. Then, the interface circuit generation unit 63 compiles the link program Pn1 which links the local variables and the reference variables to each other to generate the interface circuit 12. Also for the PLC-2 and the PLC-3, the interface circuit generation unit 63 generates the interface circuit 12 corresponding to each PLC.

According to the configuration discussed above, the distributed control system 1 is composed of the plurality of PLC-1 to PLC-3 including the variable table Tb generated by the programming tool 60 and the interface circuit 12. Such a distributed control system 1 composed of the PLC-1 to the PLC-3 achieves the same effect as that of the first embodiment. That is, the distributed control system 1 maintains a state in which sequence control can be normally executed without correcting the sequence circuit 11 or the interface circuit 12 or reallocating the link memory region Mn if a change in configuration falls within a range assumed from the variable table Tb. Thus, the expandability of the distributed control system 1 is improved.

What is claimed is:

1. A programmable logic controller comprising:
   a variable table;
   a storage device; and
   an interface circuit, wherein:
   the programmable logic controller performs sequence control in coordination with a different programmable logic controller to constitute a distributed control system;

the programmable logic controller includes reference variables which are variables to be referenced by the different programmable logic controller in the sequence control;

the variable table includes variable information including identification symbols that indicate individual programmable logic controllers that constitute the distributed control system and variable names of the reference variables, the variable information being set for each of the reference variables;

in a case where the distributed control system is expandable to include an additional programmable logic controller and the additional programmable logic controller is not connected to the distributed control system, the variable table includes information for a reference variable that is not connected to the distributed control system;

the storage device has a memory region for storing values of the reference variables; and the interface circuit mutually partially duplicates communication data for use in communication between the programmable logic controller and the different programmable logic controller, and mutually partially duplicates the values of the reference variables stored in the memory region.

2. The programmable logic controller according to claim 1, wherein:

the additional programmable logic controller includes an expansion programmable logic controller expected to be additionally installed in the distributed control system; and the programmable logic controller secures, in advance of the installation of the expansion programmable logic controller, the memory region for storing the reference values including a reference variable, which is communicated between the programmable logic controller and the expansion programmable logic controller in a case where the expansion programmable logic controller is additionally installed in the distributed control system, in the storage device on the basis of the variable table to permit additional installation of the expansion programmable logic controller.

3. A programming tool that is used to edit a sequence control program for the programmable logic controller according to claim 2, the programming tool comprising:

a variable table generation unit that receives setting of the variable information to generate the variable table; and an interface circuit generation unit that specifies the reference variables which belong to the programmable logic controller on the basis of the set variable information and the sequence control program to generate the interface circuit corresponding to the programmable logic controller.

4. The programmable logic controller according to claim 1, wherein in a case where the different programmable logic controller is removed from the distributed control system, the programmable logic controller continuously secures the memory region for storing the reference variables including a reference variable, which has been communicated between the programmable logic controller and the removed different programmable logic controller, in the storage device on the basis of the variable table to permit removal of the different programmable logic controller.

5. The programmable logic controller according to claim 4, wherein in a case where data in the memory region for storage of a reference variable transmitted by the removed different programmable logic controller has an initial value, the programmable logic controller does not execute a step of referencing the reference variable transmitted by the removed different programmable logic controller, among a plurality of steps included in a sequence control program executed by the programmable logic controller, to permit removal of the different programmable logic controller from the distributed control system.

6. A programming tool that is used to edit a sequence control program for the programmable logic controller according to claim 5, the programming tool comprising:

a variable table generation unit that receives setting of the variable information to generate the variable table; and an interface circuit generation unit that specifies the reference variables which belong to the programmable logic controller on the basis of the set variable information and the sequence control program to generate the interface circuit corresponding to the programmable logic controller.

7. The programmable logic controller according to claim 4, wherein in a case where data in the memory region for storage of a reference variable transmitted by the removed different programmable logic controller has an initial value, the programmable logic controller continues the sequence control without executing an abnormality process to permit removal of the different programmable logic controller from the distributed control system.

8. A programming tool that is used to edit a sequence control program for the programmable logic controller according to claim 7, the programming tool comprising:

a variable table generation unit that receives setting of the variable information to generate the variable table; and an interface circuit generation unit that specifies the reference variables which belong to the programmable logic controller on the basis of the set variable information and the sequence control program to generate the interface circuit corresponding to the programmable logic controller.

9. A programming tool that is used to edit a sequence control program for the programmable logic controller according to claim 4, the programming tool comprising:

a variable table generation unit that receives setting of the variable information to generate the variable table; and an interface circuit generation unit that specifies the reference variables which belong to the programmable logic controller on the basis of the set variable information and the sequence control program to generate the interface circuit corresponding to the programmable logic controller.

10. A programming tool that is used to edit a sequence control program for the programmable logic controller according to claim 1, the programming tool comprising:

a variable table generation unit that receives setting of the variable information to generate the variable table; and an interface circuit generation unit that specifies the reference variables which belong to the programmable logic controller on the basis of the set variable information and the sequence control program to generate the interface circuit corresponding to the programmable logic controller.

* * * * *